United States Patent [19]
Klanica

[11] Patent Number: 6,005,045
[45] Date of Patent: Dec. 21, 1999

[54] WATERBORNE, AMBIENT TEMPERATURE CURABLE FILM-FORMING COMPOSITIONS

[75] Inventor: Joseph A. Klanica, Sarver, Pa.

[73] Assignee: PPG Industries Ohio, Inc., Cleveland, Ohio

[21] Appl. No.: 09/028,704

[22] Filed: Feb. 24, 1998

[51] Int. Cl.[6] ............................... C08J 3/00; C08K 3/20; C08L 75/00; C08F 8/30; C08F 283/04
[52] U.S. Cl. .......................... 524/507; 524/591; 524/839; 524/840; 525/123; 525/455
[58] Field of Search ..................... 524/507, 591, 524/839, 840; 525/123, 455

[56] References Cited

U.S. PATENT DOCUMENTS

| | | | |
|---|---|---|---|
| 5,075,370 | 12/1991 | Kubitza et al. | 524/591 |
| 5,466,745 | 11/1995 | Fiori et al. | 524/801 |
| 5,545,824 | 8/1996 | Stengel et al. | |
| 5,646,213 | 7/1997 | Guo | 524/562 |
| 5,686,532 | 11/1997 | Bederke et al. | |

FOREIGN PATENT DOCUMENTS

| | | |
|---|---|---|
| 0 663 413 A2 | 1/1995 | European Pat. Off. . |
| WO 97/45475 | 4/1997 | WIPO . |

OTHER PUBLICATIONS

"Two–Component Water Reducible Polyurethane Coatings", Denise E. Fiori, Cytec Industries.

*Primary Examiner*—Patrick D. Niland
*Attorney, Agent, or Firm*—William J. Uhl

[57] ABSTRACT

A homogeneous oil-in-water emulsion suitable for use as a curable film-forming composition is provided. The emulsion is a mixture of hydrophobic polyisocyanate crosslinking agent containing at least one tertiary isocyanate group and a surface active isocyanate reactive material. The surface active isocyanate reactive material comprises an active hydrogen-containing acrylic copolymer containing aromatic groups and having a glass transition temperature of at least about 0° C. A multi-component composite coating composition is also provided by the present invention. The compositions are curable at ambient temperatures and are suitable for use in automotive applications.

21 Claims, No Drawings

WATERBORNE, AMBIENT TEMPERATURE CURABLE FILM-FORMING COMPOSITIONS

BACKGROUND OF THE INVENTION

The present invention relates to waterborne film-forming compositions that are curable at ambient or higher temperatures, comprising polyisocyanate crosslinking agents and active hydrogen-containing acrylic copolymers having high glass transition temperatures.

U.S. Pat. No. 5,466,745 to Fiori et al. discloses polyisocyanate functional crosslinking agents which can be emulsified in water with a surface active isocyanate reactive material and the emulsion used to form a curable film-forming composition. The emulsified materials are in the form of an oil-in-water emulsion which exhibits good stability and yet the polyisocyanate and isocyanate reactive material are highly reactive when applied as a film. The patent recommends that these isocyanate reactive materials have glass transition temperature ($T_g$) less than about 0° C. It is believed the low Tg materials are more mobile during the curing reaction allowing the isocyanate reactive group, i.e., hydroxyl, more opportunity to locate an isocyanate group thereby facilitating the crosslinking reaction. High $T_g$ isocyanate reactive materials, on the other hand, are relatively immobile resulting in less opportunity to locate and react with the polyisocyanate.

A drawback to using low $T_g$ isocyanate reactive materials, however, is that the resultant cured films are inherently softer and less solvent resistant than recommended for automotive applications.

It would be desirable to provide an aqueous based film-forming composition containing a polyisocyanate curing agent and an isocyanate reactive material which can be stably dispersed in water, is reactive when applied as a film, and forms a hard, solvent-resistant film.

SUMMARY OF THE INVENTION

In accordance with the present invention, an oil-in-water emulsion is provided comprising an aqueous medium having emulsified therein an organic phase comprising a mixture of:

(1) an aromatic group-containing polyisocyanate crosslinking agent which is non-dispersible in water and which contains at least two reactive isocyanate groups, at least one of which is a tertiary isocyanate group; and (2) a surface active isocyanate reactive material.

The surface active isocyanate reactive material comprises an active hydrogen-containing acrylic copolymer having a glass transition temperature of at least about 0° C., prepared from a mixture of polymerizable ethylenically unsaturated monomers comprising about 5 to about 80 preferably about 10 to about 40 percent by weight, based on the total solid weight of monomers used to prepare the copolymer, of an ethylenically unsaturated aromatic monomer. The emulsion is suitable for use as a film-forming composition (coating) and is curable at ambient or elevated temperatures. The emulsions are stable and have surprisingly good reactivity when applied as a coating. Although not intending to be bound by any theory, it is believed the use of an ethylenically unsaturated aromatic monomer which provides the higher $T_g$ makes the higher $T_g$ acrylic polymer more compatible with regard to the aromatic group-containing polyisocyanate, enabling the isocyanate reactive groups to better align with the isocyanate groups thereby facilitating cure.

A multi-component composite coating composition is also provided by the present invention. The coating composition comprises a base coat deposited from a pigmented film-forming composition and a transparent top coat applied over the base coat in which the transparent coat, or clear coat, is deposited from the oil-in-water emulsion described above.

DETAILED DESCRIPTION

Suitable polyisocyanate crosslinking agents for use in the emulsifiable composition of the present invention include any liquid or solid aromatic group-containing polyisocyanate containing at least two reactive (unblocked) isocyanate groups, at least one of which is a tertiary isocyanate group. By aromatic is meant aryl alaryl and araliphatic bound isocyanates. Such polyisocyanate crosslinking agents should in and of themselves be substantially hydrophobic and non-dispersible in water. Mixtures of polyisocyanates are also suitable. When mixtures of polyisocyanates are used, at least one of the polyisocyanates contains a tertiary polyisocyanate group and aromatic group. Examples of polyisocyanates include, but are not limited to, meta-$\alpha,\alpha,\alpha',\alpha'$-tetramethylxylylenediisocyanate, para-$\alpha,\alpha,\alpha'$,$\alpha'$-tetramethylxylylenediisocyanate, as well as biurets and isocyanurates of diisocyanates, wherein at least one of the diisocyanates used to prepare the biuret or isocyanurate contains a tertiary isocyanate group.

A preferred polyisocyanate comprises a urethane adduct of a polyol with a diisocyanate containing at least one tertiary isocyanate group. Suitable polyols include, for example, ethylene glycol, propylene glycol, neopentyl glycol, trimethylolpropane, pentaerythritol, and the like. Oligomeric and polymeric polyols are also suitable.

The surface active isocyanate reactive material contains both (i) functionality capable of reacting with isocyanate groups, as well as (ii) hydrophilizing functionality capable of rendering the surface active isocyanate reactive material water dispersible.

The preferred surface active isocyanate reactive material is an acrylic copolymer, with the hydrophilizing groups and isocyanate reactive functionality being incorporated into the polymer via appropriate monomer selection or subsequent modification. As examples of such may be mentioned carboxyfunctional ethylenically unsaturated monomers and hydroxyfunctional ethylenically unsaturated monomers.

Isocyanate reactive functionality, as utilized herein refers to functionality which is reactive with isocyanate groups under cure conditions of the curable emulsions. Such isocyanate reactive functionality is generally well known to those skilled in the coatings art and includes, most commonly, active hydrogen functionality such as hydroxyl and amino groups. Hydroxyl is typically utilized as the isocyanate reactive functionality in coatings and is preferred for use in the present invention.

Hydrophilizing functionality is also generally well known to those skilled in the coatings art and includes, most commonly, anion generating, cation generating and hydrophilic non-ionic functionality. By anion generating and cation generating is meant functionality such as carboxyl (anion generating) or amino (cation generating) which, when appropriately neutralized, becomes hydrophilic in nature. Hydrophilic non-ionic functionality is, in and of itself, hydrophilic in nature. The amount of hydrophilizing functionality present in the isocyanate reactive material should, upon at least partial neutralization of the anion generating or cation generating groups (if present), be sufficient to render the isocyanate reactive material water-dispersible.

The active hydrogen-containing acrylic copolymers have a glass transition temperature ($T_g$) greater than about 0° C. The $T_g$ is described in *PRINCIPLES OF POLYMER CHEMISTRY*, Flory, Cornell University Press, Ithaca, N.Y., 1953, at pages 52–57. The $T_g$ can be calculated as described by Fox in *Bull. Amer. Physic. Society*, 1, 3, page 123 (1956). The $T_g$ can be measured experimentally by using a penetrometer such as a Du Pont 940 Thermomedian Analyzer. The $T_g$ of the polymers as used herein refers to the calculated values unless otherwise indicated.

Suitable acrylic copolymers are copolymers of one or more polymerizable acrylic monomers such as acid functional acrylic monomers, amine functional acrylic monomers, hydroxyl functional acrylic monomers, and other polymerizable unsaturated monomers such as vinyl monomers. The copolymers may be prepared in organic solvent using conventional free radical polymerization techniques.

The polymer should contain about 5 to about 80, preferably about 10 to about 40 percent by weight, based on the total solid weight of monomers used to prepare the acrylic copolymer, of a polymerizable ethylenically unsaturated aromatic monomer; from about 5 to about 80, preferably from about 10 to 40 percent by weight, based on the total solid weight of monomers used to prepare the polymer, of an ethylenically unsaturated, hydroxyl functional acrylic monomer; and about 20 to about 95, preferably from about 30 to about 70 percent by weight, based on the total solid weight of monomers used to prepare the acrylic copolymer, of at least one different ethylenically unsaturated monomer.

The ethylenically unsaturated aromatic monomer may be selected from monomers such as styrene and alpha-methyl styrene, including substituted styrene or substituted alpha-methyl styrene where substitution is in the para position and is a linear or branched alkyl group having from about 1 to about 20 carbon atoms, for example, vinyl toluene, 4-vinylanisole, and 4-vinylbenzoic acid. Also the ethylenically unsaturated aromatic monomer may contain fused aryl rings. Examples include 9-vinylanthracene and 9-vinylcarbazole. Mixtures of monomers may also be used. By "monomer" is meant true monomer; i.e., it is not intended to include dimers, such as alpha-methyl styrene dimer, trimers, or oligomers.

The ethylenically unsaturated hydroxyl functional monomer may be selected from, inter alia, hydroxyethyl acrylate, hydroxyethyl methacrylate, hydroxypropyl acrylate, hydroxypropyl methacrylate, hydroxybutyl acrylate, hydroxybutyl methacrylate, and mixtures thereof, with hydroxyethyl methacrylate being preferred.

Additional different ethylenically unsaturated monomers used to prepare the acrylic copolymer include acid group-containing acrylic monomers such as acrylic acid and methacrylic acid; amine groups containing monomers such as dimethylaminoethyl methacrylate, tert-butylaminoethyl methacrylate; and meta-isopropenyl-α,α-dimethyl benzylamine; alkyl esters of acrylic acid or methacrylic acid such as those having 1–10 carbon atoms in the alkyl group such as methyl methacrylate, butyl acrylate, butyl methacrylate, 2-ethylhexyl methacrylate and cyclohexyl methacrylate and other polymerizable ethylenically unsaturated monomers such as nitriles such acrylonitrile and methacrylonitrile; vinyl and vinylidene halides such as vinyl chloride and vinylidene fluoride and vinyl esters such as vinyl acetate.

Acid and amine functional monomers such as acrylic and methacrylic acid and dimethylaminoethyl methacrylate, tert-butylaminoethyl methacrylate; and meta-isopropenyl-α,α-dimethylobenzyl amine are preferred because upon neutralization of the acid or amine group, the copolymer is made hydrophilic. The acid or amine functional monomer are used in amounts of up to about 25% by weight, preferably about 1.0 to about 10.0%, based on total solid weight of monomers used to prepare the acrylic polymer. The alkyl esters of acrylic and methacrylic acid are used in amounts of up to about 89%, preferably about 30 to about 80% by weight, based on total solid weight of monomers used to prepare the acrylic copolymer. The other copolymerizable ethylenically unsaturated, when used are used in amounts of up to about 80%, preferably about 10 to about 40%, by weight based on total solid weight of monomers used to prepare the acrylic copolymer.

The acrylic copolymer typically has a number average molecular weight ($M_n$) of about 700 to about 50,000, preferably about 1000 to about 12,000 as determined by gel permeation chromatography using a polystyrene standard, an acid number, in the case of anion generating groups, of about 15 to about 150 mg KOH/g resin, preferably about 20 to about 70 mg KOH/g resin, more preferably about 20 to about 35 mg KOH/g resin; and an amount of active hydrogen groups from about 2.5% to about 6% by weight, preferably about 3% to about 5% by weight, more preferably about 3.5% to about 4.5% by weight, on a 100% solids basis.

When coating compositions are formulated from the emulsifiable compositions of the present invention, preferably the polyisocyanate crosslinking agent and the surface active isocyanate reactive material comprise the primary film-forming components of the coating. The components are preferably present in amounts such that the NCO:active hydrogen group ratio is in the range of about 0.5:1 to about 2:1, preferably about 0.8:1 to about 1.2:1.

The emulsifiable compositions of the present invention, particularly when used as coating compositions, may also comprise additional ingredients such as, for example, neutralizing agents for rendering the surface active isocyanate reactive material water-dispersible, cure catalysts, and relatively minor amounts of organic solvent.

When an acid group is present on the isocyanate reactive material, any base may be used as the neutralizing agent to produce an anionic surface active material. Normally, a base capable of converting a carboxyl group to a carboxylate ion is used as the neutralizing agent, including organic and inorganic bases such as sodium and potassium hydroxide, sodium and potassium carbonate, and amines such as ammonia, primary, secondary, and tertiary amines. Similarly, when an amine group is present on the acrylic copolymer, any acid may be used as the neutralizing agent to produce a cationic surface active material. When utilized, the neutralizing agents may be present in the organic phase to be emulsified, the aqueous medium into which the organic phase is emulsified, or both. The total amount of neutralizing agent should be sufficient to emulsify the polyisocyanate, the acrylic copolymer and other optional ingredients and the aqueous phase in the form of an oil-in-water emulsion.

Besides the polyisocyanate, the acrylic copolymer and water, the composition can contain optional ingredients, particularly cure catalyst and organic solvents.

Cure catalysts for isocyanates are well known to those skilled in the art. Preferred are organometallic catalysts and, particularly, organotin compounds such as dibutyltin diacetate, dibutyltin dioxide, dibutyltin dilaurate and the like.

The organic solvents are generally those present in the various components. For example, many coatings components are not commercially available on a 100% solids basis, but are rather a somewhat lower solids content in an appropriate solvent. Preferably, no other organic solvent is or need be added to the emulsifiable compositions (or emulsion) to achieve acceptable results.

Other optional ingredients such as, for example, plasticizers, surfactants, thixotropic agents, anti-gassing agents, organic cosolvents, flow controllers, anti-oxidants, UV light absorbers and similar additives conventional in the art may be included in the composition The oil-in-water emulsions of the present invention are produced by the steps of:
(a) admixing the components forming the organic phase of the emulsion, organic phase may be defined as greater than 50% organic by weight; and thereafter
(b) contacting the mixture with an aqueous medium in proportions and under conditions so as to yield an oil-in-water emulsion.

The emulsions can be prepared by any number of well-known techniques, but are preferably prepared by adding the aqueous medium, either continuously or in portions, to the organic phase under mixing conditions until phase inversion occurs. Additional aqueous medium can then be added to adjust the emulsion to the desired solids content and viscosity.

The aqueous medium may comprise solely water, or may comprise other components such as the neutralizing agent, as indicated above. The aqueous medium may additionally include one or more other auxiliaries and additives common in the art, as well as minor amounts of water miscible organic solvent to aid in emulsification or to adjust viscosity. Preferably any such additional ingredients will be added to the organic phase and the aqueous medium will comprise solely water or water plus a neutralizing agent.

The oil-in-water compositions prepared by the above procedure may be used as curable film-forming compositions (coatings).

Film-forming compositions of the present invention may be cured at ambient temperature; i.e., 20 to 25° C., or heated up to as high as about 93° C. (200° F.) as desired to effect cure.

The film-forming composition of the present invention is typically used as a clear coat applied alone to a substrate or on top of a colored base coat as part of a multi-component composite coating composition. Suitable base coats include any known to those skilled in the art. Base coats curable at ambient temperatures are preferred.

Alternatively, the composition of the present invention may contain color pigments conventionally used in surface coatings and may be used as a base coat or high gloss monocoat; that is, a high gloss pigmented coating. By "high gloss" it is meant that the cured coating has a 20° gloss and/or a DOI ("distinctness of image") measurement of at least about 80 as measured by standard techniques known to those skilled in the art. Such standard techniques include ASTM D523 for gloss measurement and ASTM E430 for DOI measurement.

Color pigments conventionally used in surface coatings are suitable and include, for example, inorganic pigments such as titanium dioxide, iron oxides, chromium oxide, lead chromate, and carbon black, and organic pigments such as phthalocyanine blue and phthalocyanine green. Mixtures of the above mentioned pigments may also be used. Suitable metallic pigments include in particular aluminum flake, copper bronze flake and metal oxide coated mica, nickel flakes, tin flakes, and mixtures thereof.

When present, the pigment is incorporated into the coating composition in amounts of about 1 to about 80 percent by weight based on the total weight of coating solids. The metallic pigment is employed in amounts of about 0.5 to about 25 percent by weight based on the total weight of coating solids.

The film-forming compositions can be applied to various substrates to which they adhere including wood, metals, glass, and plastic. The compositions can be applied by conventional means including brushing, dipping, flow coating, spraying and the like, but they are most often applied by spraying. The usual spray techniques and equipment for air spraying and electrostatic spraying and either manual or automatic methods can be used.

During application of a base coat composition to the substrate, a film of the base coat is formed on the substrate. Typically, the base coat thickness will be about 0.01 to about 5 mils (about 0.254 to about 127 microns), preferably about 0.1 to about 2 mils (about 2.54 to about 50.8 microns) in thickness.

After application of the base coat to the substrate, a film is formed on the surface of the substrate by driving solvent, i.e., organic solvent and/or water, out of the base coat film by an air drying period, sufficient to ensure that the clear coat can be applied to the base coat without dissolving the base coat composition. Suitable drying conditions will depend on the particular base coat composition, and on the ambient humidity with certain waterborne compositions, but in general a drying time of from about 5 to 60 minutes will be adequate to ensure that mixing of the two coats is minimized. At the same time, the base coat film is adequately wetted by the clear coat composition so that satisfactory intercoat adhesion is obtained. Also, more than one base coat and multiple clear coats may be applied to develop the optimum appearance. Usually between coats, the previously applied coat is flashed; that is, exposed to ambient conditions for about 1 to 20 minutes.

The clear topcoat composition may be applied to the base coated substrate by any conventional coating technique such as brushing, spraying, dipping or flowing, but spray applications are preferred because of superior gloss. Any of the known spraying techniques may be employed such as compressed air spraying, electrostatic spraying and either manual or automatic methods.

After application of the clear coat composition to the base coat, the coated substrate is allowed to cure at ambient temperature. The coated substrate may also be heated as desired, often up to about 93° C. (200° F.). In the curing operation, solvents are driven off and the film-forming materials of the clear coat and the base coat are each crosslinked. The curing operation is usually carried out at a temperature in the range of from 20 to 25° C., or up to about 93° C. The thickness of the clear coat is usually from about 0.5 to about 5 mils (about 12.7 to about 127 microns), preferably about 1.2 to about 3 mils (about 30.5 to about 76.2 microns).

The invention will be further described by reference to the following examples.

EXAMPLES A THROUGH I

Examples A through I illustrate the preparation of acrylic copolymers. Examples A through C and F are illustrative of copolymers used in the present invention, demonstrating preparation of acrylic copolymers containing a variety of ethylenically unsaturated aromatic monomers at various levels. Examples D, E and G through I are comparative in that they demonstrate the preparation of acrylic copolymers containing monomers or dimers that have high $T_g$'s, but not ethylenically unsaturated aromatic monomers.

Example A

An acrylic copolymer ($T_g=25°$ C.) containing 35% by weight styrene was prepared as follows:

DOWANOL PM Acetate (276.60 parts, Dipropylene glycol monomethyl ether acetate, available from Dow Chemical Co.) was charged into a four-neck flask which was equipped with a thermocouple, a reflux condenser with a nitrogen inlet adapter and a stirrer, and heated to reflux under a nitrogen gas blanket. The initiator di-tert-amyl peroxide (67.08 parts) and 103.62 parts of BUTYL CELLOSOLVE acetate (2-butoxyethyl ester of acetic acid, available from Union Carbide Chemicals and Plastics Co., Inc.) were mixed together (initiator mixture). A total of 391.25 parts of styrene, 324.18 parts butyl acrylate, 335.36 parts hydroxyethyl methacrylate, and 67.07 parts acrylic acid were also mixed together (feed A). The initiator mixture was added dropwise to the reaction vessel over a period of about 3.5 hours while maintaining the reaction at reflux. Ten minutes after the start of the initiator addition, feed A was added dropwise to the reaction vessel over a period of 3 hours. At the completion of the addition of feed A, a rinse of 22.88 parts DOWANOL PM acetate was added. At the completion of the initiator addition, a rinse of 11.9 parts DOWANOL PM acetate was added, and the reaction mixture was held at reflux for 1 hour. After the completion of the hold time, the reaction mixture was then cooled. The final product had a solids content of about 73 percent, a measured acid value of 34.6, a hydroxyl group content of 2.9% and a number average molecular weight of about 4458 as determined by gel permeation chromatography using a polystyrene standard.

Example B

An acrylic copolymer ($T_g=2°$ C.) containing 19% by weight styrene, 45% by weight butyl acrylate, 30% hydroxyethyl methacrylate, and 6% acrylic acid was prepared as in Example A. The final product had a solids content of about 73 percent, a measured acid value of 34.7, a hydroxyl group content of 2.9% and a number average molecular weight of about 3845 as determined by gel permeation chromatography using a polystyrene standard.

Example C

An acrylic copolymer ($T_g=5°$ C.) containing 19% by weight styrene was prepared as follows:

A mixture of DOWANOL PM Acetate (259.3 parts) and BUTYL CELLOSOLVE acetate (259.3 parts) was charged into a suitable reactor, and heated to reflux under a nitrogen gas blanket. The initiator di-tert-amyl peroxide (125.8 parts) and 194.3 parts of BUTYL CELLOSOLVE acetate were mixed together (initiator mixture). A total of 398.2 parts of styrene, 869.8 parts butyl acrylate, 733.5 parts hydroxyethyl methacrylate, and 94.3 parts acrylic acid were also mixed together (feed A). The initiator mixture was added dropwise to the reaction vessel over a period of about 3.5 hours while maintaining the reaction at reflux, and feed A was added dropwise to the reaction vessel over a period of 3 hours. Pressure in the reaction vessel was allowed to increase to 32 psi. At the completion of the addition of feed A, a rinse of 42.9 parts DOWANOL PM acetate was added. At the completion of the initiator addition, a rinse of 22.3 parts DOWANOL PM acetate was added, and the reaction mixture was held under pressure at reflux for 1 hour. After the completion of the hold time, the reaction mixture was then cooled and the pressure relieved. The final product had a solids content of about 69.9 percent, a measured acid value of 26.5, a hydroxyl group content of 3.2% and a number average molecular weight of about 2736 as determined by gel permeation chromatography using a polystyrene standard.

Examples D Through I

The copolymers of Examples D through I were prepared using the procedure of Example C, except that styrene was replaced as shown in the following table:

| Example | Monomer | Solids | Acid Value | $M_n$ |
|---|---|---|---|---|
| D, Comparative ($T_g = 6°$ C.) | methyl styrene dimer | 69.9% | 25.6 | 706 |
| E, Comparative ($T_g = 13°$ C.) | isobornyl methacrylate | 69.9% | 25.5 | 1366 |
| F ($T_g = 5°$ C.) | vinyl toluene | 69.9% | 25.3 | 2760 |
| G, Comparative ($T_g = 5°$ C.) | methyl methacrylate | 69.9% | 25.2 | 1251 |
| H, Comparative ($T_g = 10°$ C.) | cyclohexyl methacrylate | 69.9% | 25.8 | 1320 |
| I, Comparative ($T_g = 0°$ C.) | isobutyl methacrylate | 69.9% | 25.6 | 1367 |

EXAMPLES 1 THROUGH 10

Examples 1 through 10 illustrate the preparation of oil-in-water emulsions, used to prepare curable film-forming compositions. Examples 1 through 4 and 7 are illustrative of compositions of the present invention, demonstrating preparation of compositions containing a variety of aromatic functional acrylic copolymers at various levels. Examples 5, 6, and 8 through 10 are comparative in that they demonstrate the preparation of compositions containing acrylic copolymers that have high $T_g$'s, but that are not aromatic functional, or, as in Example 5, contain an acrylic copolymer prepared from a dimer. The ingredients were mixed in the order listed.

All compositions were prepared by premixing the acrylic copolymer(s) with the neutralizing amine, surfactant, additives, catalyst, and solvent to form a stable "Component 1." The polyisocyanates, which when co-mixed would form a stable "Component 2," were then thoroughly mixed into Component 1. The deionized water (Component 3) was then added and mixed in, preferably manually until phase inversion occurred to form an oil-in-water emulsion. Sufficient deionized water was added to yield a sprayable composition.

| Ingredient | Example 1 (35% total styrene in copolymer(s)) | Example 2 (27% total styrene in copolymer(s)) | Example 3 (19% total styrene in copolymer(s)) |
|---|---|---|---|
| Copolymer of Example A | 76.6 grams | 38.4 | — |
| Copolymer of Example B | — | 40.1 | 80.0 |
| Triethylamine | 4.7 | 4.7 | 4.7 |
| Dibutyltin diacetate | 0.3 | 0.3 | 0.3 |
| TINUVIN 384[1] | 2.0 | 2.0 | 2.0 |
| TINUVIN 123[2] | 1.0 | 1.0 | 1.0 |
| FC-430 surfactant[3] | 0.5 | 0.5 | 0.5 |
| BUTYL CELLOSOLVE Acetate | 5.0 | 5.0 | 5.0 |

-continued

| Ingredient | Example 1 (35% total styrene in copolymer(s)) | Example 2 (27% total styrene in copolymer(s)) | Example 3 (19% total styrene in copolymer(s)) |
|---|---|---|---|
| CYTHANE 3174[4] | 44.5 | 44.4 | 44.5 |
| TOLONATE HDT-LV[5] | 7.4 | 7.4 | 7.4 |
| Deionized water | 192.3 | 180.9 | 196.9 |

[1] Ultraviolet light stabilizer available from Ciba-Geigy Corp.
[2] Sterically hindered aminoether light stabilizer available from Ciba Geigy Corporation.
[3] Nonionic fluorosurfactant available from 3M Corporation
[4] Adduct of trimethylolpropane with meta-a,a,a',a'-tetramethylxylylenediisocyanate, 74% solids in butyl acetate, 10.2 weight percent free isocyanate, available from CYTEC Industries, Stamford, CT
[5] Trimer of hexamethylene diisocyanate, available from Rhone Poulenc, Cranbury, NJ

| Ingredient | Example 4 (19% total styrene in copolymer) | Example 5* (19% total methyl styrene dimer in copolymer) | Example 6* (19% total isobornyl methacrylate in copolymer) |
|---|---|---|---|
| Copolymer of Example C | 65.2 grams | — | — |
| Copolymer of Example D | — | 67.1 | — |
| Copolymer of Example E | — | — | 65.5 |
| Dimethyl ethanolamine | 2.1 | 2.1 | 2.1 |
| BYK-375[1] | 0.5 | 0.5 | 0.5 |
| TINUVIN 384 | 2.0 | 2.0 | 2.0 |
| TINUVIN 123 | 1.0 | 1.0 | 1.0 |
| 10% dibutyltin diacetate solution in BUTYL CELLOSOLVE acetate | 0.5 | 0.5 | 0.5 |
| CYTHANE 3174 | 55.1 | 55.1 | 55.1 |
| TOLONATE HDT-LV | 6.7 | 6.7 | 6.7 |
| Deionized water | 161 | 92 | 118 |

*Comparative Example
[1] Surfactant available from BYK Chemie, Wallingford, CT

| Ingredient | Example 7 (19% total vinyl toluene in co-polymer) | Example 8* (19% total methyl methacrylate in copolymer) | Example 9* (19% total cyclohexyl methacrylate in copolymer) | Example 10* (19% total isobutyl methacrylate in copolymer) |
|---|---|---|---|---|
| Copolymer of Example F | 66.3 grams | — | — | — |
| Copolymer of Example G | — | 65.0 | — | — |
| Copolymer of Example H | — | — | 65.1 | — |
| Copolymer of Example I | — | — | — | 65.0 |
| Dimethyl ethanolamine | 2.1 | 2.1 | 2.1 | 2.1 |
| BYK-375 surfactant | 0.5 | 0.5 | 0.5 | 0.5 |
| TINUVIN 384 | 2.0 | 2.0 | 2.0 | 2.0 |
| TINUVIN 123 | 1.0 | 1.0 | 1.0 | 1.0 |
| 10% dibutyltin diacetate solution in BUTYL CELLOSOLVE acetate | 0.5 | 0.5 | 0.5 | 0.5 |
| CYTHANE 3174 | 55.1 | 55.1 | 55.1 | 55.1 |
| TOLONATE HDT-LV | 6.7 | 6.7 | 6.7 | 6.7 |
| Deionized water | 138 | 96 | 119 | 117 |

Two sets of test panels were prepared as follows: Twenty steel panels (two for each example) measuring 4 inches×12 inches (10.16 cm×30.48 cm) which had been previously coated with an electrodeposited primer and a primer surfacer available from PPG Industries, Inc. as ED5000 and GPX05379, respectively, were wet sanded with #600 grit paper, solvent wiped and then treated with an epoxy/amine primer sealer. To one set of panels a black waterborne base coat was also applied, available from PPG Industries, Inc., as ENVIROBASE®. Drying times prior to application of the compositions of the examples were variable and were either at ambient temperature or at temperatures not exceeding 150° F. (65.6° C.).

The compositions of the examples were spray applied using conventional spray equipment, applying approximately 1.5–3.0 mils (38.1–76.2 microns) in two coats with an approximate 10 minute ambient temperature flash between coats. In the first set of panels (no base coat), the compositions of the examples were sprayed as clear coats directly over the primed panels for purposes of determining the Tukon Hardness of the cured film without the softer base coat influencing hardness (eliminating a source of variability).

All panels were allowed to cure at ambient conditions for a minimum of 24 hours (±4 hours) before a gasoline soak test was done. All other testing was done after the sprayed panels were allowed to cure at ambient conditions for 7 days. Some testing was done with the color-plus-clear composite panels and some was done with the clear coat directly over the primed panels as indicated. Results are reported in the table below.

| Example | Tukon Hardness[1] | MEK double rubs (50)[2] | % Film retention[3] | Gasoline Soak[4] |
|---|---|---|---|---|
| 1 | 12.6 | not done | not done | not done |
| 2 | 13.3 | not done | not done | 4B |
| 3 | 11.0 | not done | not done | not done |
| 4 | 11.0 | slight to moderate film erosion | 94% | 4A |
| 5* | 4.7 | moderate film erosion | 65% | 1C |
| 6* | 8.4 | heavy film erosion | 83% | 3B |

-continued

| Example | Tukon Hardness[1] | MEK double rubs (50)[2] | % Film retention[3] | Gasoline Soak[4] |
| --- | --- | --- | --- | --- |
| 7 | 10.2 | moderate film erosion | 92% | 3B |
| 8* | 4.9 | moderate film erosion | 85% | 2C |
| 9* | 8.1 | heavy film erosion | 91% | 2B |
| 10* | 7.4 | heavy film erosion | 84% | 2B |

[1]Tukon hardness is the Knoop hardness value measured using a Tukon Microhardness Tester Model 300 from Wilson Instruments according to ASTM D1474-92. Higher numbers indicate greater hardness. Tests were conducted on panels on which the clear coat was applied directly to the primed substrate. Testing was done after 7 days cure at ambient temperature.
[2]Resistance to methylethyl ketone solvent tested according to ASTM D5402. Tests were conducted on panels on which the clear coat was applied directly to the primed substrate. Testing was done after 7 days cure at ambient temperature.
[3]% Film Retention was determined by measuring the film thickness before and after the MEK solvent rubs. Tests were conducted on panels on which the clear coat was applied directly to the primed substrate. Testing was done after 7 days cure at ambient temperature.
[4]The Gasoline Soak test was done on panels that were coated with a base coat and a clear coat, after 24 hours of ambient temperature cure to determine the film's resistance to gasoline. A 1 inch x 4 inch (2.54 cm x 10.16 cm) strip of the panel is partially submerged in 93 octane gasoline for three minutes, removed and the gasoline is allowed to evaporate for 1 ½ minutes. With cheesecloth wrapped snugly around the index finger and applying light, uniform pressure, three double rubs are done. Any marring, dulling or softening of the film constitutes a level of failure. Film softness and gloss loss is rated separately but recorded as a single result. Film softness is rated using the numerical scale from 5 to 1, wherein 5 indicates no change and 1 indicates film failure. Gloss loss is rated on a scale from A to C, wherein A indicates no gloss loss and C indicates substantial gloss loss.

The data in the table indicate that compositions prepared in accordance with the present invention (Examples 1–4 and 7) demonstrate excellent cure response as evidenced by film hardness and solvent and gasoline resistance. Compositions prepared with copolymers containing high $T_g$ monomers other than the aromatic monomers encompassed by the invention (Examples 5, 6, and 8–10) do not cure as well.

We claim:

1. An oil-in-water emulsion comprising an aqueous medium having emulsified therein an organic composition comprising a mixture of:
   (1) a hydrophobic, aromatic group containing polyisocyanate crosslinking agent containing at least two reactive isocyanate groups, at least one of which is a tertiary isocyanate group; and
   (2) a surface active isocyanate reactive material;
comprising an active hydrogen-containing acrylic copolymer having a glass transition temperature of at least 0° C., and prepared from a mixture of polymerizable ethylenically unsaturated monomers containing from about 5 to about 80 percent by weight, based on the total solid weight of monomers used to prepare the copolymer, of an ethylenically unsaturated aromatic monomer, wherein said emulsion is curable at ambient temperatures.

2. The oil-in-water emulsion of claim 1 wherein the mixture of ethylenically unsaturated monomers contains about 5 to about 80 percent by weight, based on the total solid weight of monomers of an ethylenically unsaturated, hydroxyl functional monomer.

3. The oil-in-water emulsion of claim 1 wherein the ethylenically unsaturated aromatic monomer is selected from the group consisting of styrene, alpha-methyl styrene, substituted styrene, substituted alpha-methyl styrene and ethylenically unsaturated monomers containing fused aryl rings.

4. The oil-in-water emulsion of claim 2 wherein the ethylenically unsaturated, hydroxyl functional monomer is a hydroxyalkyl acrylate or methacrylate.

5. The oil-in-water emulsion of claim 1 wherein the polyisocyanate crosslinking agent of component (1) comprises a urethane adduct of a polyol with a diisocyanate containing at least one tertiary isocyanate group.

6. The oil-in-water emulsion of claim 5 wherein the polyol is trimethylolpropane.

7. The oil-in-water emulsion of claim 5 wherein the diisocyanate is meta-$\alpha,\alpha,\alpha',\alpha'$-tetramethylxylylenediisocyanate.

8. A curable film-forming composition derived from an oil-in-water emulsion comprising an aqueous medium having emulsified therein an organic composition comprising, as the primary film-forming components, a mixture of:
   (1) a hydrophobic, aromatic group containing polyisocyanate crosslinking agent containing at least two reactive isocyanate groups, at least one of which is a tertiary isocyanate group; and
   (2) a surface active isocyanate reactive material;
wherein the surface active isocyanate reactive material comprises an active hydrogen-containing acrylic copolymer having a glass transition temperature of at least 0° C., and prepared from a mixture of polymerizable ethylenically unsaturated monomers containing from about 5 to about 80 percent by weight, based on the total solid weight of monomers used to prepare the copolymer, of an ethylenically unsaturated aromatic monomer, wherein said composition is curable at ambient temperatures.

9. The composition of claim 8 wherein the mixture of ethylenically unsaturated monomers contains about 5 to about 80 percent by weight, based on the total solid weight of monomers used to prepare the copolymer, of an ethylenically unsaturated, hydroxyl functional monomer.

10. The composition of claim 9 wherein the ethylenically unsaturated aromatic monomer is selected from the group consisting of styrene, alpha-methyl styrene substituted styrene, substituted alpha-methyl styrene and ethylenically unsaturated monomers containing fused aryl rings.

11. The composition of claim 9 wherein the ethylenically unsaturated, hydroxyl functional monomer is a hydroxyalkyl acrylate or methacrylate.

12. The composition of claim 8 wherein the polyisocyanate crosslinking agent of component (1) comprises a urethane adduct of a polyol with a diisocyanate containing at least one tertiary isocyanate group.

13. The composition of claim 12 wherein the polyol is trimethylolpropane.

14. The composition of claim 12 wherein the diisocyanate is meta-$\alpha,\alpha,\alpha',\alpha'$-tetramethylxylylenediisocyanate.

15. A multi-component composite coating composition comprising a base coat deposited from a pigmented film-forming composition and a transparent top coat applied over the base coat in which the transparent top coat is deposited from a clear film-forming composition derived from an oil-in-water emulsion comprising an aqueous medium having emulsified therein an organic composition comprising, as the primary film-forming components, a mixture of:
   (1) a hydrophobic, aromatic group containing polyisocyanate crosslinking agent containing at least two reactive isocyanate groups, at least one of which is a tertiary isocyanate group; and
   (2) a surface active isocyanate reactive material;
wherein the surface active isocyanate reactive material comprises an active hydrogen-containing acrylic copolymer having a glass transition temperature of at least 0° C., and prepared from a mixture of polymerizable ethylenically unsaturated monomers containing from about 5 to about 80 percent by weight, based on the total solid weight of monomers used to prepare the copolymer, of an ethylenically unsaturated aromatic monomer, wherein said multi-component composite coating composition is curable at ambient temperatures.

16. The multi-component composite coating composition of claim 15 wherein the mixture of polymerizable ethylenically unsaturated monomers contains from about 5 to about 80 percent by weight, based on the total solid weight of monomers used to prepare the copolymer, of an ethylenically unsaturated, hydroxyl functional monomer.

17. The multi-component composite coating composition of claim 15 wherein the ethylenically unsaturated aromatic monomer is selected from the group consisting of styrene, alpha-methyl styrene substituted styrene, substituted alpha-methyl styrene and ethylenically unsaturated monomers containing fused aryl rings.

18. The multi-component composite coating composition of claim 16 wherein the ethylenically unsaturated, hydroxyl functional monomer is a hydroxyalkyl acrylate or methacrylate.

19. The multi-component composite coating composition of claim 15 wherein the polyisocyanate crosslinking agent of component (1) comprises a urethane adduct of a polyol with a diisocyanate containing at least one tertiary isocyanate group.

20. The multi-component composite coating composition of claim 19 wherein the polyol is trimethylolpropane.

21. The multi-component composite coating composition of claim 17 wherein the diisocyanate is meta-$\alpha,\alpha,\alpha',\alpha'$-tetramethylxylylenediisocyanate.

\* \* \* \* \*